(12) United States Patent
Lisowski

(10) Patent No.: US 6,762,523 B1
(45) Date of Patent: Jul. 13, 2004

(54) CONTINUOUSLY VARIABLE ELECTROMAGNETIC TRANSMISSION

(75) Inventor: Leszek Lisowski, Neuchâtel (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 10/048,214

(22) PCT Filed: Aug. 3, 2000

(86) PCT No.: PCT/EP00/07535

§ 371 (c)(1),
(2), (4) Date: Jan. 30, 2002

(87) PCT Pub. No.: WO01/13500

PCT Pub. Date: Feb. 22, 2001

(30) Foreign Application Priority Data

Aug. 11, 1999 (EP) .............................. 99115822

(51) Int. Cl.⁷ ........................... H02K 51/00; B60K 6/04
(52) U.S. Cl. ....................... 310/103; 310/266; 310/268; 192/84.5
(58) Field of Search ................................. 310/103, 266, 310/268; 464/29; 192/84.5

(56) References Cited

U.S. PATENT DOCUMENTS

| | | | | |
|---|---|---|---|---|
| 1,476,458 A | * | 12/1923 | Murray ........................ | 475/155 |
| 2,138,231 A | * | 11/1938 | Gebhardt ...................... | 290/17 |
| 2,680,203 A | * | 6/1954 | Zozulin et al. ................ | 310/94 |
| 4,163,914 A | * | 8/1979 | Keyes ......................... | 310/103 |
| 4,239,092 A | * | 12/1980 | Janson ........................ | 188/267 |
| 4,770,061 A | * | 9/1988 | Martinez ...................... | 475/154 |
| 5,477,094 A | * | 12/1995 | Lamb ......................... | 310/75 D |
| 5,834,872 A | * | 11/1998 | Lamb ......................... | 310/103 |
| 5,907,199 A | * | 5/1999 | Miller ......................... | 310/12 |
| 6,217,298 B1 | * | 4/2001 | Klaui ......................... | 417/420 |

FOREIGN PATENT DOCUMENTS

| | | |
|---|---|---|
| EP | 0 771 687 A | 5/1997 |
| EP | 0 798 844 A | 10/1997 |
| WO | WO 99/39426 A | 8/1999 |

* cited by examiner

Primary Examiner—Burton Mullins
(74) Attorney, Agent, or Firm—Sughrue Mion, PLLC

(57) ABSTRACT

The continuously variable electromagnetic transmission comprises a commutator-less, axial flux dynamoelectric machine (3) provided with an input shaft (2) and an output shaft (4), and means (20) for controlling and supplying electric power at a variable frequency to said machine. The dynamoelectric machine comprises a stator (16), a first rotor (12) which is connected to the input shaft, and a second rotor (15) which is connected to the output shaft and arranged in such a way that it can interact with the first rotor and the stator, whereby the two rotors and the stator are formed by discoid elements. The transmission comprises means for axially displacing at least one of the discoid elements in order to modify the width of the axial air gap between said element and an adjacent discoid element, whereby the magnetic field can be regulated by variations in said gap and the two rotors can be mechanically coupled to each other. Said transmission can be used in a motor vehicle, especially a vehicle with hybrid propulsion

12 Claims, 6 Drawing Sheets

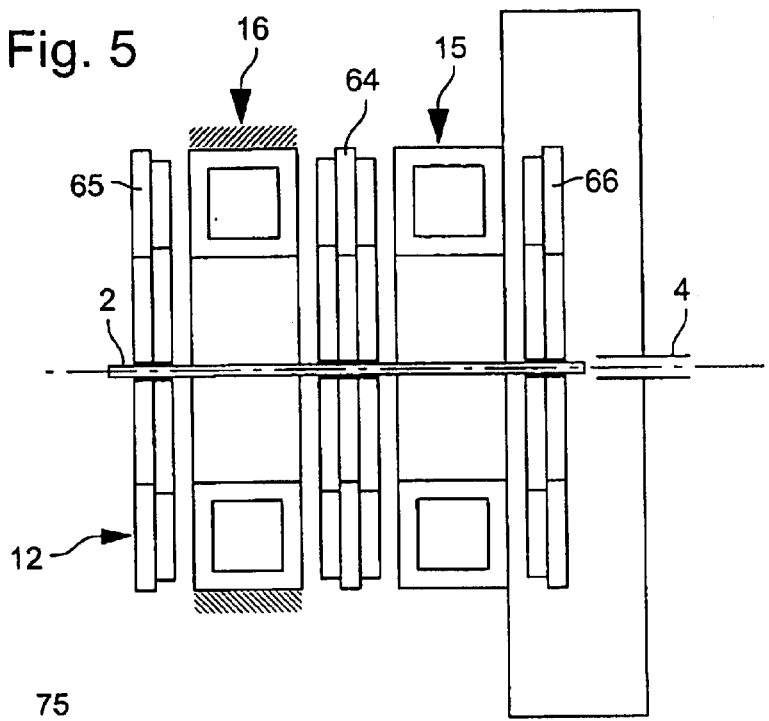
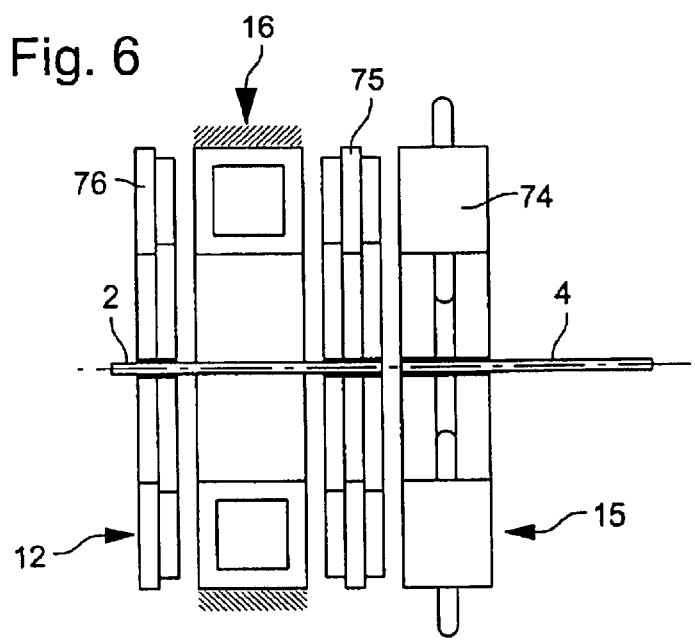
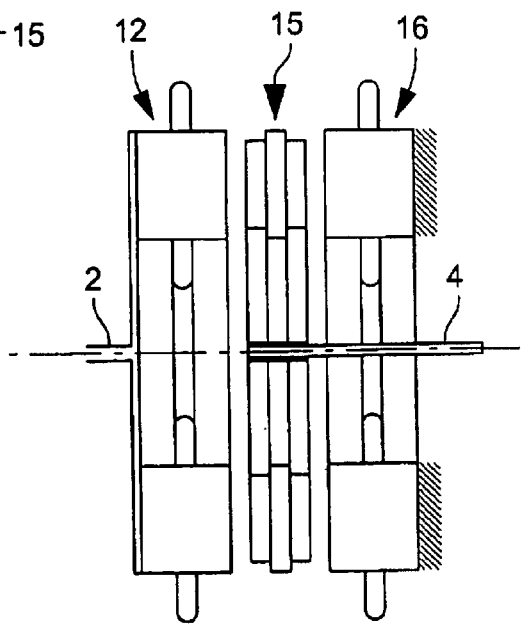

CONTINUOUSLY VARIABLE ELECTROMAGNETIC TRANSMISSION

BACKGROUND OF THE INVENTION

The present invention concerns a continuously variable electromagnetic transmission, including a commutator-less, axial flux dynamoelectric machine provided with an input shaft and an output shaft, and means for controlling and supplying electric power at a variable frequency to said machine, the dynamoelectric machine including a first rotor connected to the input shaft, a second rotor connected to the output shaft and a stator assembly, the two rotors and the stator assembly being formed by discoid elements, the stator and at least one of the rotors having respective active elements provided with windings connected to the control and supply means and arranged to interact with the other rotor by means of magnetic flux through air gaps including axial air gaps between respective discoid elements of the rotors and the stator assembly.

Continuously variable electromagnetic transmissions comprising two rotors which thus co-operate with a common stator have already been proposed prior to 1920 in the form of-commutator machines, in particular direct current machines. See for example U.S. Pat. Nos. 1,392,349 and 1,515,322, which disclose axial flux machines, and U.S. Pat. No. 1,493,853 which discloses a radial flux machine with two concentric rotors inside a single stator. However, these commutator machines have a complicated construction and require a lot of maintenance, so that they have not met with commercial success.

Since several years, there has been a resurgence of interest in electromagnetic transmissions of this type, because progress in power electronics has enabled them to be powered at a variable frequency, determined as a function of the respective speeds of the shafts and as a function of the desired power flux, and has enable them to be made in the form of commutator-less machines, for example synchronous machines with permanent magnets.

Patent Application Nos. EP 0 798 844 and WO 99/39426 (corresponding to U.S. Pat. No. 6,373,160) disclose continuously variable transmissions of the type indicated in the preamble, of the axial field type, i.e. the rotor and stator assembly elements have a generally discoid shape. The use of discoid elements offers in particular easy access to each shaft from the stator, which enables the electric power connections to be easily made on rotating rings secured to the shaft, and a cooling fluid to be distributed into the heart of the machine. Moreover, the discoid shape of the elements enables great freedom as to the dimensions and arrangement of the elements, for example by grouping several modular elements on a same shaft in order to increase the power of the machine or by using elements of different diameters or of different types in the same machine.

SUMMARY OF THE INVENTION

The object of the present invention is to improve an electromagnetic transmission with axial flux and discoid elements so as to improve its operating conditions and thus broaden its possible uses.

The invention therefore concerns an electromagnetic transmission of the type indicated in the preamble, characterised in that it includes displacement means for axially displacing at least one of the discoid elements to modify the width of the axial air gap between this element and an adjacent discoid element.

The possibility of varying the width of an air gap, via axial displacement of a discoid element, allows the magnetic field to be adjusted as a function of the desired operating conditions, which enlarges the speed range and allows the working of the machine to be optimised. This is practically impossible with rotors of cylindrical shape. Moreover, via axial displacement of one or more elements, the discoid shape of the rotor elements allows direct mechanical coupling between the rotors so as to establish, upon demand, direct meshing between the input and output shafts, without having to add the separate clutch provided in European document No. 0 866 544 in the case of a machine of cylindrical shape. This coupling may advantageously use the displacement means intended for modifying the width of an air gap.

BRIEF DESCRIPTION OF THE DRAWINGS

Other features and advantages of the present invention will appear in the following description of various preferred embodiments, given solely by way of non limiting example with reference to the annexed drawings, in which:

FIGS. 3 to 7 show schematically in axial cross-section various possible combinations, from among many others, of discoid elements in an electromagnetic transmission according to the invention.

DETAILED DESCRIPTION OF THE INVENTION

Figure 1:
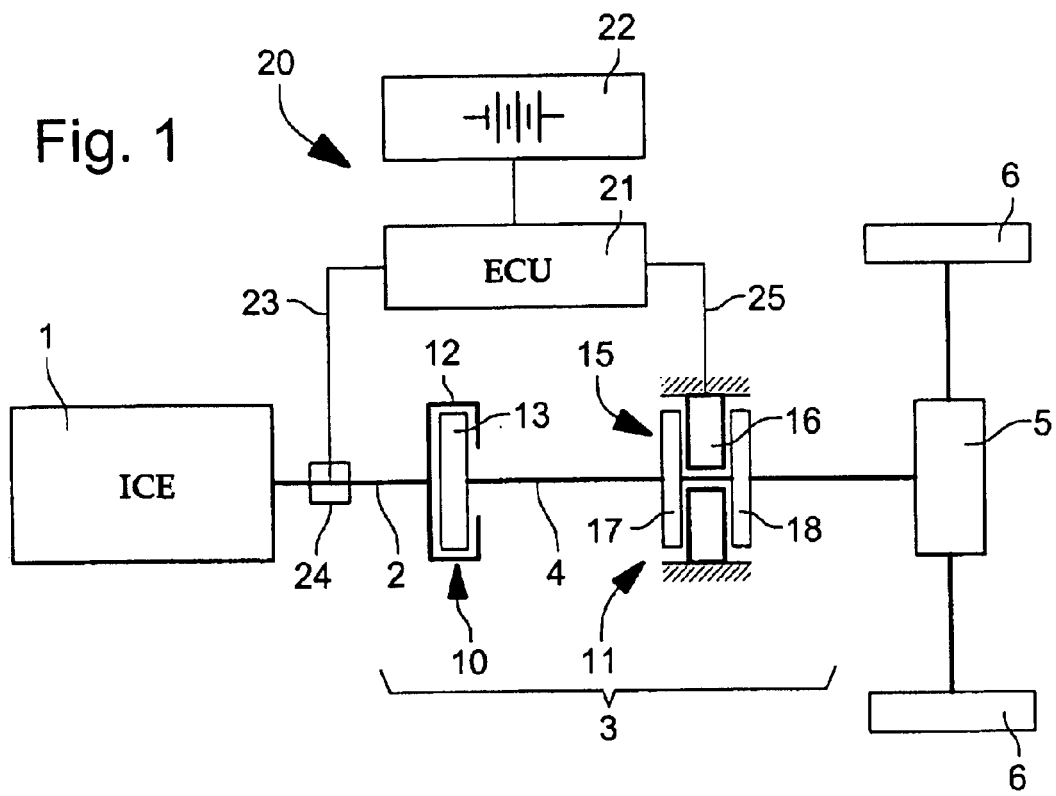
FIG. 1 shows schematically a hybrid traction assembly for a motor vehicle, including a continuously variable electromagnetic transmission according to the invention.

In the hybrid traction system shown in FIG. 1, a thermal motor 1, for example an internal combustion engine (ICE) directly drives the input shaft 2 of a continuously variable electromagnetic transmission 3, the output shaft 4 of which drives, via a differential 5, the wheels 6 of one or more driving axles of the vehicle. In order to understand the working of dynamoelectric machine 3, it may be assumed that it includes two parts 10 and 11 each able to constitute a commutator-less electric machine which can operate as a motor or a generator. The first part 10 includes a first rotor 12, connected to input shaft 2, and a rotor element 13 connected to output shaft 4 and forming part of a second rotor 15 which is common to the two parts 10 and 11 of part 3.

Second part 11 of machine 3 includes a stator 16 which co-operates, in the present case, with two rotor elements 17 and 18 connected to output shaft 4. All of rotor and stator elements 12, 13, 16, 17 and 18 are discoid elements, having between them air gaps which extend into radial planes and in which the magnetic flux has an axial direction. However, the flux may have a radial direction in certain parts of the machine, for example in the circumferential air gap between elements 12 and 13, as will be explained hereinafter.

In FIG. 1, the discoid elements which are active, i.e. having windings connected to control and powering means 20, are shown in bold lines, whereas the reactive elements, such as 13, 17 and 18 are shown in thin lines. The control and powering means are shown very schematically in the drawing in the form of an electronic control unit (ECU) 21 connected to an accumulator battery 22. These means will not be described in detail here, since they can be made in a known manner. The reader may refer this regard in particular to the European Patent Applications cited hereinbefore. It will simply be mentioned that unit 21 preferably contains two polyphased AC/DC converters connected to each other and to battery 22 by a direct current network, one of these converters being connected to first rotor 12 by a polyphased connection 23 and a contact ring device 24, placed on this rotor or on input shaft 2, whereas the second converter is connected to stator 16 by a polyphased connection 25.

Knowing that the two active elements (first rotor 12 and stator 16 in the example of FIG. 1) can operate in two states, namely a motor state and a generator state, and that they are associated with two adjustable frequency and amplitude converters and a battery, it is possible to control the powering of the active elements appropriately by means of the converters in order to obtain the desired speed differences between the rotors and the stator, and to achieve easily and optimise the energy exchange between the input and output shafts in both directions. This fact justifies the use of the term "continuously variable" for the transmission according to the invention.

First part 10 of the machine is capable of rotating output shaft 4 in the opposite direction to the rotation of input shaft 2 to drive the vehicle in reverse, owing to an appropriate sequence of electric powering phases. It may also be used as a starter for starting motor 1 and as an electromagnetic clutch when the vehicle is started, whereas second part 11 can be used for purely electric propulsion if motor 1 is stopped.

The number of phases is greater than or equal to two and it is preferably equal to three.

It will be noted that each of the two machine parts 10 and 11 may be, as selected, of the asynchronous type or the synchronous type with permanent magnets. Each of them may include any number of discoid elements, as a function of the available dimensions from the point of view of the diameter and axial length of machine 3.

On the other hand, it is important to note that the two parts 10 and 11 of machine 3 may in reality be tightly grouped so that the magnetic flux passes through them axially from one end to the other of the machine.

It will also be noted that the polyphased connection 23 could occur on output shaft 4 instead of input shaft 2, if it is element 13 which is active instead of first rotor 12.

Figure 2:
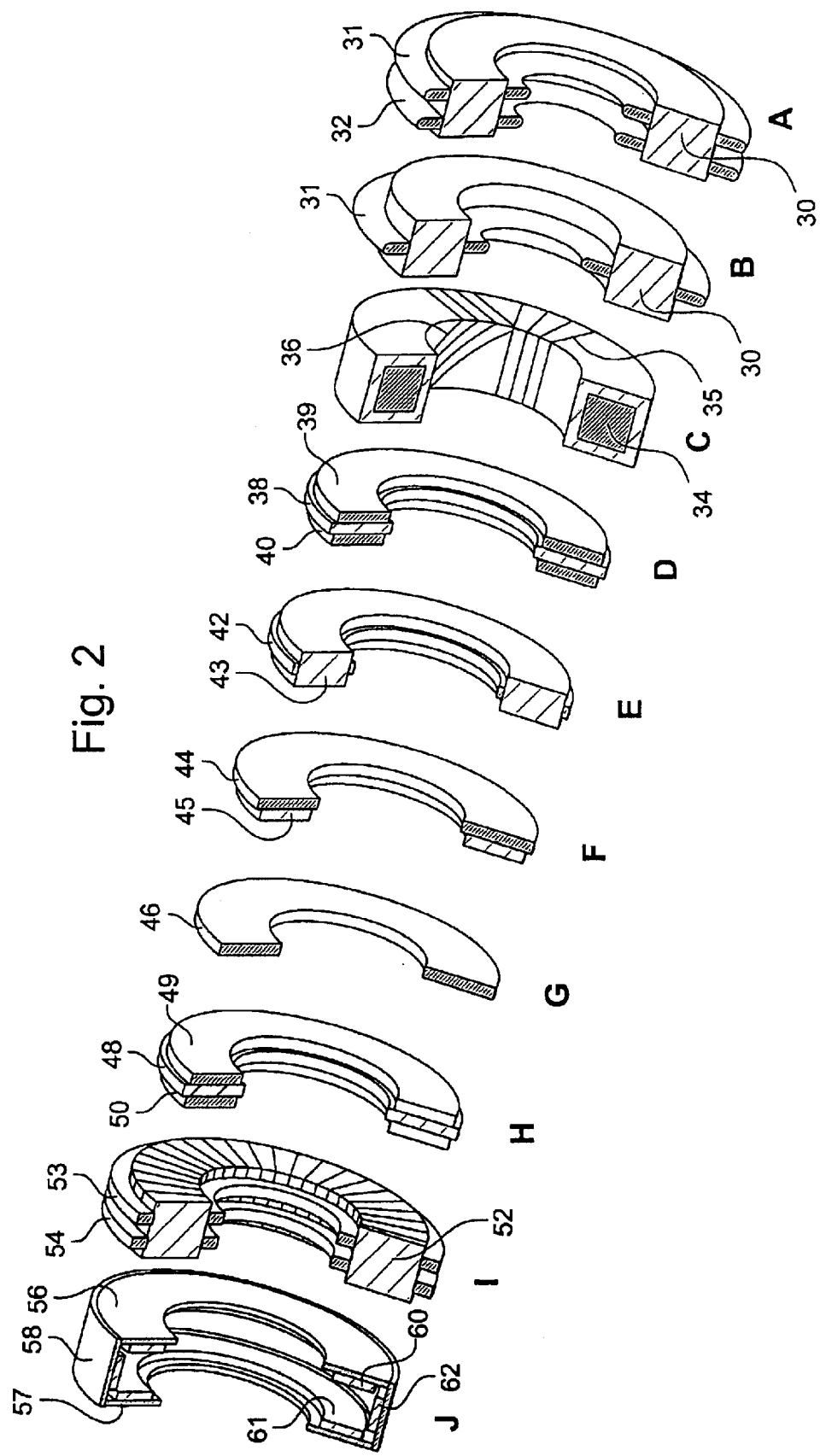
FIG. 2 shows, in partially cut perspective, various types of discoid elements able to be used in an electromagnetic transmission according to the invention.

FIG. 2 shows various types A to J of discoid elements able to be used to form rotors 12 and 15 and stator 16 defined hereinbefore. Each rotor or stator may include one of more of these elements, of the same type or of a different type depending on the particular case. The elements of types A, B and C are active elements, whereas those of types D to J are reactive elements.

The A type element includes an annular ferromagnetic core 30 carrying two polyphased coils 31 and 32 each extending in a radial plane, i.e. perpendicular to the rotational axis of the machine. The windings of coils 31 and 32 are formed of turns whose active conductor sections pass into radial notches. which may or may not be closed laterally, of core 30.

The B type element is similar to the A type element, but only has a single coil 31.

The C type element has a core 34 which may or may not be ferromagnetic. Two types of coils may be placed on this core, as desired: a coil 35 whose turns extend in axial planes or a coil 36 having bent turns of which the two radial sides are offset by one polar step of the coil.

The D, E and F type elements are permanent magnet elements, thus of the synchronous type. Their core may or may not be ferromagnetic.

The D type element has a core 38 on both faces of which are fixed circular rows of permanent magnets 39 and 40. Conversely, in the E type element, permanent magnets 43 pass through core 42. In the case of the F type, core 44 carries permanent magnets 45 on only one of its faces. Such an element is used with a ferromagnetic core if it has to close the field lines at the end of a line. If, conversely, its core is not ferromagnetic, only the magnetic flux will pass through it.

The G type element is formed of a simple ferromagnetic disc 46 used to close the field lines in a circumferential direction or to make the magnetic flux pass axially between two other discoid elements.

The H and I type elements are of the asynchronous type. In the H type, a ferromagnetic core 48 carries a conductive layer 49, 50, for example, made of aluminum or copper, on each of its faces, to form a rotor. An element of the same type (not shown) may have only one conductive layer on only one of its faces.

The I type element has a ferromagnetic core 52 carrying a short circuit coil of the cage type, or more exactly two of such coils 53 and 54 in the present case. Each coil 53, 54, is arranged in a radial plane and passes through core 52 in radial notches which may be open or closed. The I type element will preferably have a single cage when it is an end element, to close the field lines, and preferably a double cage if the magnetic flux has to pass through it axially.

The J type element is a discoid element with a C profile, i.e. its core includes two annular discs 56 and 57 connected by a tubular part 58. It will be noted that the C profile may be open towards the interior, as FIG. 2 shows, or towards the exterior to frame an annular disc of larger diameter. Each of the three parts 56 to 58 of the core is covered, on the side of the interior of the C profile, by permanent magnets 60, 61 and 62 to form a synchronous type element. However, this element could be designed in the asynchronous form, by replacing magnets 60 to 62 with conductive layers similar to layers 49 and 50 of the H type element.

FIGS. 3 to 7 shows various examples of possibilities of combining certain of the discoid elements shown in FIG. 2 in the dynamoelectric machine 3 shown in FIG. 1.

Figure 3:
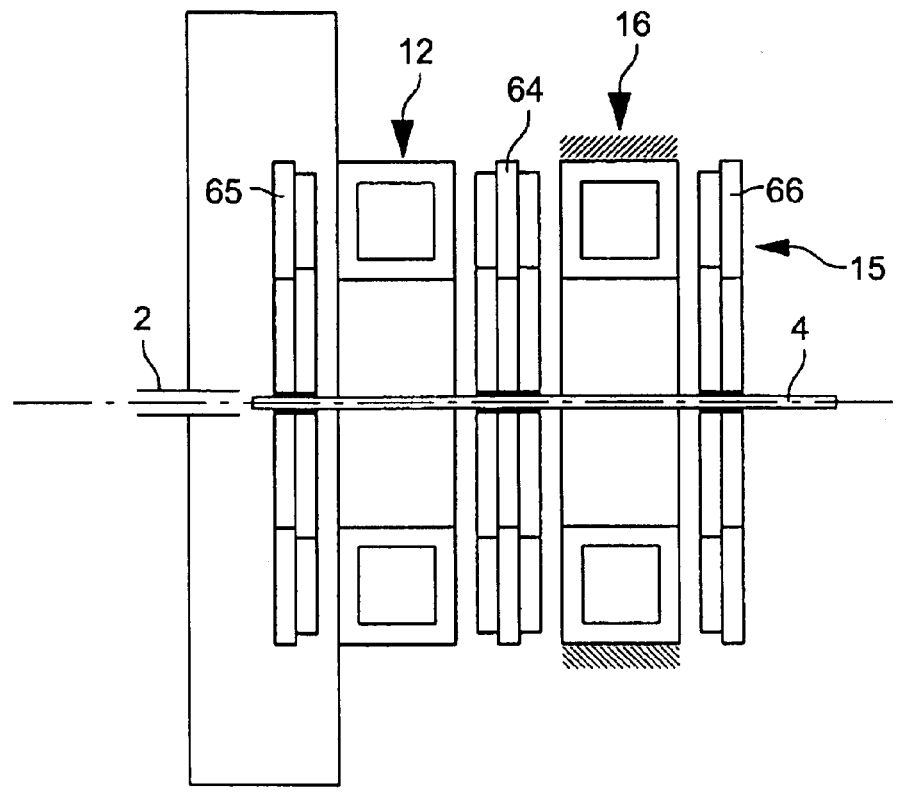
Figure 4:
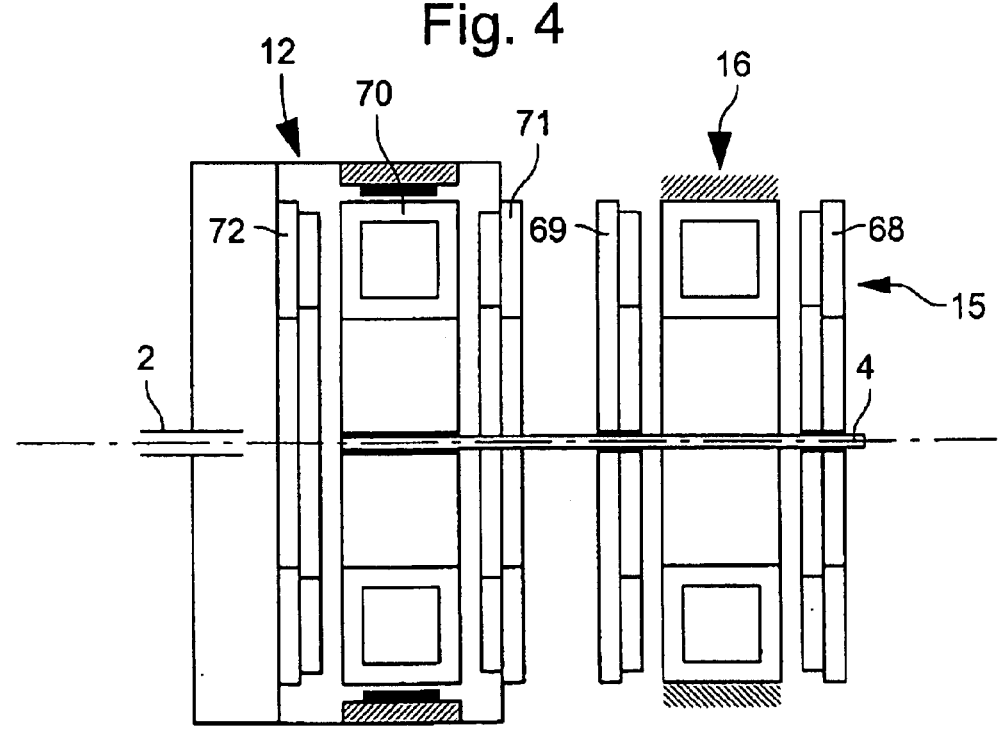

According to FIG. 3, the first rotor 12 connected to input shaft 2 includes an A or C type active element. Stator 16 also includes an A or C type active element. Rotor 15 connected to output shaft 4 is formed of reactive elements including a central element 64 through which the flux passes between stator 16 and first rotor 12, and two end elements 65 and 66 provided with a ferromagnetic core to close the field lines. In an asynchronous version, element 64 can be of the I type, and elements 65 and 66 of the single face H type. In a synchronous version, element 64 may be of the D or E type, and elements 65 and 66 of the F type with a ferromagnetic core.

According to FIG. 4, stator 16 is again formed by an A or C type active element framed by two reactive elements 68 and 69 forming part of second rotor 15 and having magnetic cores to close the field lines. These elements may be of the single face H type in the asynchronous case or the F type in the synchronous case. The other active element is an A or C type element 70 belonging to second rotor 15 and framed by two elements 71 and 72 of first rotor 12. These latter may be of one of the aforementioned types for elements 68 and 69.

The arrangement according to FIG. 5 is similar to that of FIG. 3, except that the roles of the two shafts 2 and 4 of the two rotors 12 and 15 are reversed. The discoid elements can thus be the same as in FIG. 3.

According to FIG. 6, stator 16 is still formed as in the preceding examples, whereas the other active element 74 forms part of second rotor 15 and can be of the B type. First rotor 12 includes a central element 75, through which the flux between the stator and element 74 passes, and an end element 76. These elements 75 and 76 may be of the same types as elements 64 and 65 shown in FIG. 3.

Finally, in the example of FIG. 7, stator 16 and first rotor 12 are each formed by a B type active end element, and the second rotor placed between them is formed of a reactive element through which the flux passes axially, in particular of the E or I type, or provided with a ferromagnetic core to close the field lines, in particular of the D or H type.

Figure 8:
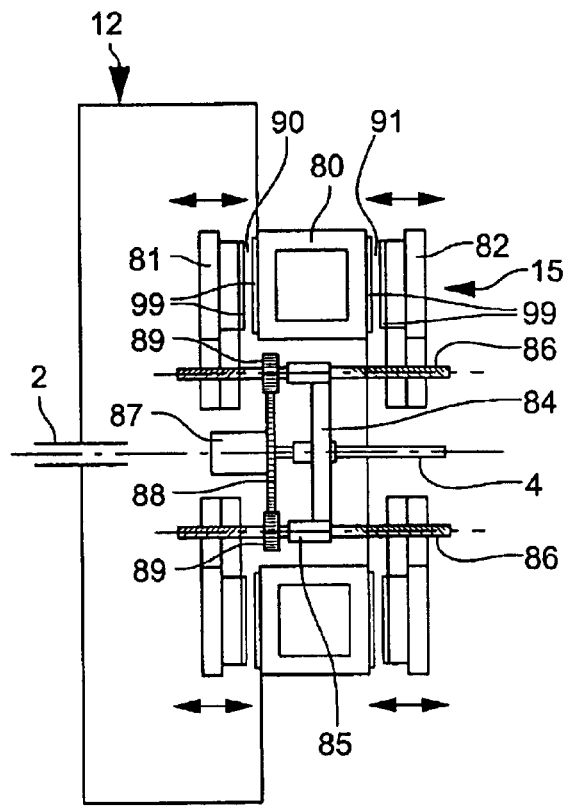
FIG. 8 shows schematically in axial cross-section a particular embodiment of a part of the dynamoelectric machine, including displacement means for modifying two air gaps between elements of the two rotors.

In the particular embodiment illustrated by FIG. 8, first rotor 12 includes an active discoid element 80 secured to input shaft 2 and framed symmetrically by two reactive discoid elements 81 and 82 of second rotor 15, such elements being able to be displaced axially as indicated by the arrows. Output shaft 4 is provided with a central support 84 including bearings 85 in which two or more axial screws 86 are mounted so as to rotate freely. On either side of their bearing 85 screws 86 have threads of opposite directions which are engaged in threaded holes of the two elements 81 and 82 to support the latter and determine their spacing which may vary symmetrically by a synchronised rotation of the screws. For this purpose, shaft 4 is provided with a small electric motor 87 driving a central toothed wheel 88 which meshes with pinions 89 secured to screws 86.

Especially when reactive discoid elements 81 and 82 are of the permanent magnet type, their symmetrical arrangement with respect to element 80 has the advantage of balancing the large axial forces due to the magnets. These forces are simply absorbed in screws 86.

As a result of this mechanism which can be controlled by an electronic control unit for the transmission such as unit 21 shown in FIG. 1, it is possible to advantageously create a control of the magnetic field by varying the width between symmetrical air gaps 90 and 91 between element 80 and reactive elements 81 and 82. It is then advantageous to keep a small air gap width at low speeds and thus obtain high values for the field and the induced voltage, thus a reduced current value for a given torque, whether the machine is operating in motor mode or generator mode. At higher speeds, the control intervenes by increasing the air gap width, progressively or by stages, to weaken the field and the induced voltage in order to keep a sufficient difference between the latter and the supply voltage of the windings. This control also acts in a known manner on the power supply by the converters in control unit 21 shown in FIG. 1. Thus by controlling the difference between the supply voltage and the induced voltage, it becomes possible to optimise the efficiency of the assembly formed by transmission 3 and the converters of control unit 21.

Such control also has the advantage of allowing the working of the machine to be adjusted to the state of battery 22, whose direct voltage can vary considerably. For example, when the battery voltage and thus the supply voltage of the machine is low, the weakening of the field at high speeds prevents the induced voltage reaching or exceeding the supply voltage, so that the machine can still operate over the whole range of speeds for which it is provided.

Since the example described here concerns the interaction between elements of the two rotors, it applies to the first machine part 10 shown in FIG. 1, but a mechanism of the same type may also be provided in second machine part 11, in this case in the stator or in the second rotor.

Further, the same mechanism can mechanically couple (by friction or positively) the two rotors by gripping element 80 between elements 81 and 82, to transmit the torque from input shaft 2 in direct drive to output shaft 4 or vice versa. Beforehand, the electric power supply of active element 80 will have been set to a zero frequency in order to synchronise the two rotor speeds. This synchronisation may be effected while the transmission is operating on charge. In the example shown in FIG. 8, the coupling is effected by friction, and for this purpose, the mutually opposite faces of discoid elements 80, 81 and 82 preferably include friction pads 99 in air gaps 90 and 91.

Figure 9:
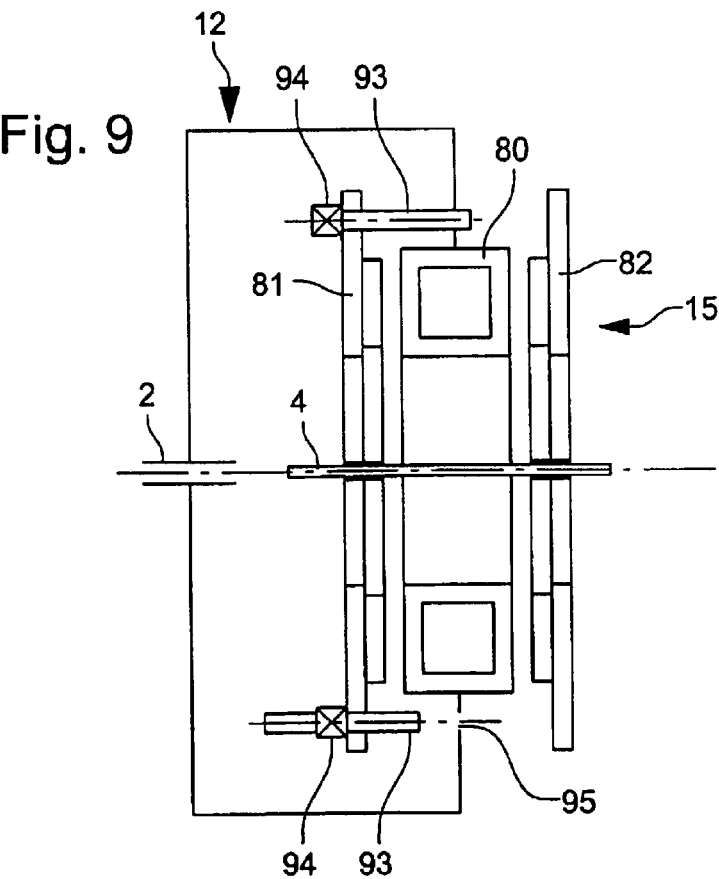
FIG. 9 shows schematically in axial cross-section another particular embodiment of a part of the dynamoelectric machine, including coupling means for connecting the first rotor to the second rotor in rotation.

Another means of direct coupling between the two rotors 12 and 15, by positive coupling, is shown schematically in FIG. 9. In this example, discoid element 81 of second rotor 15 carries several rods 93 capable of sliding axially into this element via the action of respective electromagnets 94 to be engaged in holes 95 of first rotor 12 like the claws of a dog coupling. In order to simplify the drawing, the top rod is shown engaged while the other one is not, but of course in reality they occupy the same position at the same time. Here too, the electric power supply of active element 80 will have first been set to a zero frequency in order to synchronise the two rotor speeds prior to coupling. Such a positive coupling may be incorporated in the structure according to FIG. 8 if one wishes to avoid friction coupling.

Figure 10:
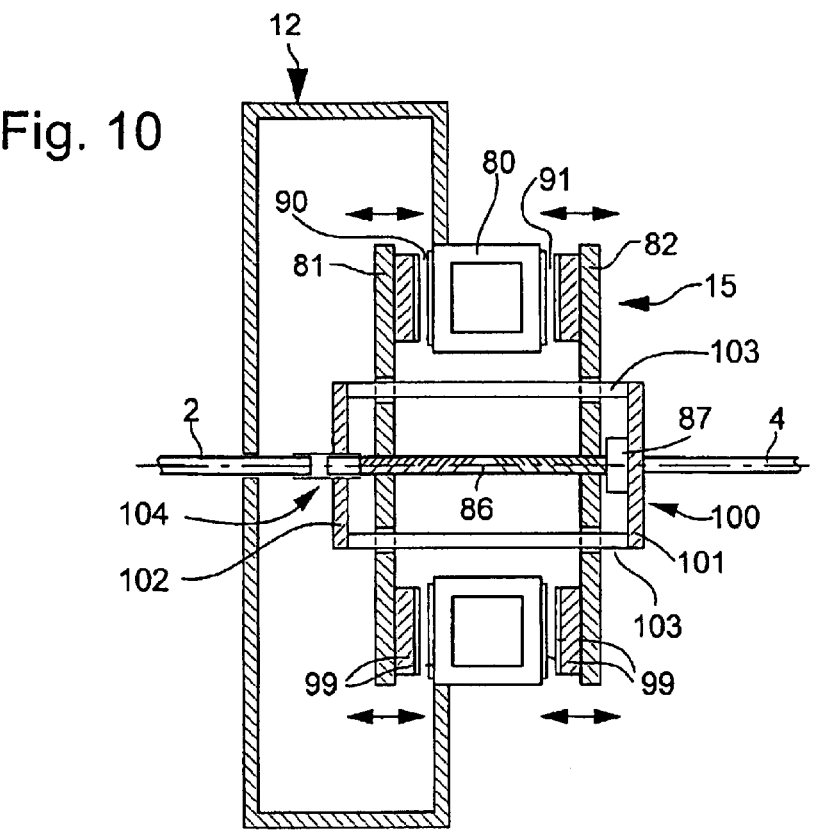
FIGS. 10 and 11 show two variants of the displacement means with similar rotor elements to those of FIG. 8.

FIG. 10 shows a variant of the displacement means shown in FIG. 8, whose offset axial screws 86 are replaced by a single similar axial screw 86 aligned with output shaft 4 and driven in rotation directly by the control motor 87. The moving discoid elements 81 and 82 are not supported transversely by the screw, but by a central support 100 in the shape of a frame fixed to shaft 4, this support having two flanges 101 and 102 and several longitudinal bars 103 which pass through and support elements 81 and 82 in a sliding manner. Flange 101 is fixed to shaft 4 and carries motor 87 whose shaft is connected to screw 86. The other flange 102 supports the other end of screw 86 and can advantageously be supported by input shaft 2 via a bearing 104. This mechanism operates like that of FIG. 8.

Figure 11:
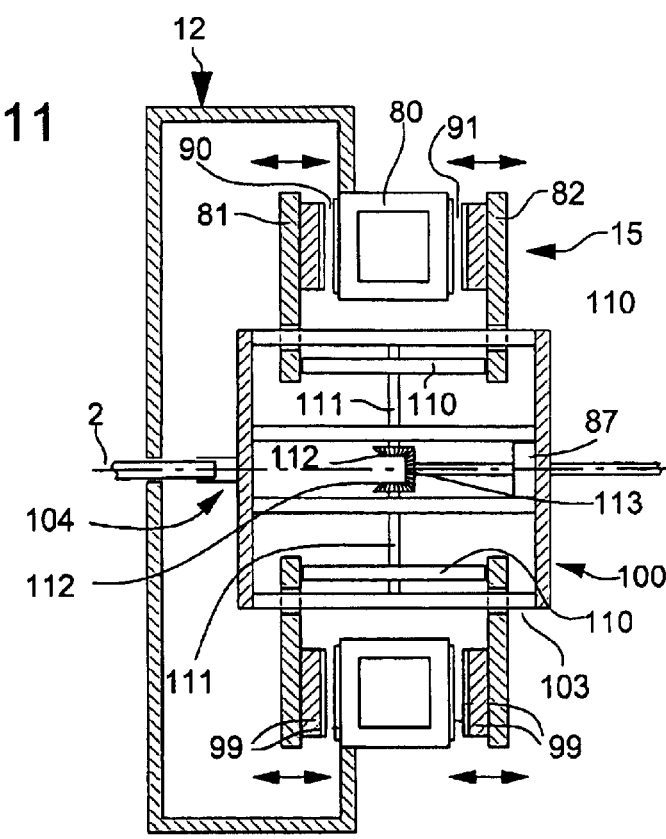
Figure 12:
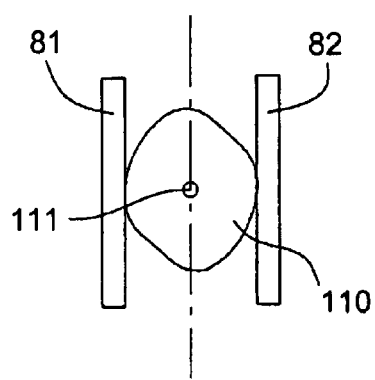
FIG. 12 shows a cam of the mechanism shown in FIG. 11.

In the variant of FIGS. 11 and 12, the screw mechanism of FIG. 10 is replaced by a cam mechanism 110 mounted on central support 100. Several identical cams 110, preferably at least three for reasons of stability of the discoid elements, are inserted between moving discoid elements 81 and 82 which are kept pressed against the cams by the large attraction forces F of their permanent magnets, so that the cams determine their spacing. Each cam 110 is fixed to an individual radial shaft 11 provided with a conical pinion 112. The position and synchronised rotation of the cams are controlled by electric motor 87 which drives all of pinions 112 together by means of a central conical pinion 113. This mechanism operates like that of FIG. 8. The magnetic attraction forces F are so high that they allow friction coupling without being liable to slide between element 80 and elements 81 and 82.

With reference to FIG. 1, it will also be noted that first machine part 10 can be used as an electric starter for motor 1 when output shaft 4 is blocked. Such blocking can be effected either by wheels 6, or by a parking brake on shaft 4 or on differential 5, or by blocking second machine part 11 by powering at a zero frequency or mechanically with one of the displacement means shown in FIGS. 8 to 11.

What is claimed is:

1. A continuously variable electromagnetic transmission, including a commutator-less, axial flux dynamoelectric machine provided with an input shaft and an output shaft, and control means for controlling and supplying electric power at a variable frequency to said machine, said dynamoelectric machine including a first rotor connected to said input shaft, a second rotor, connected to said output shaft, and a stator assembly, said two rotors and said stator assembly comprising discoid elements, said discoid elements of said stator assembly and of at least one of said rotors comprising active elements having windings connected to said control means and arranged to interact with the other rotor by means of magnetic flux through air gaps including axial air gaps between respective ones of said discoid elements of said rotors and said stator assembly, wherein said transmission includes displacement means for axially displacing at least one of said discoid elements to modify the width of the axial air gap between the displaced one of said discoid elements and an adjacent discoid element, at least one of said displaced discoid element and said adjacent discoid element being one of said active elements having windings connected to said control means.

2. A transmission according to claim 1, wherein said discoid elements include at least one reactive element.

3. A transmission according to claim 2, wherein said reactive element is a synchronous permanent magnet type element.

4. A transmission according to claim 2, wherein said reactive element is an asynchronous type element.

5. A transmission according to claim 1, wherein at least one of said first rotor and said second rotor includes at least two discoid elements between which a discoid element of the stator or of the other rotor is located.

6. A transmission according to claim 1, wherein said stator assembly includes at least two discoid elements between which a discoid element of one of said rotors is located.

7. A transmission according to claim 1, wherein said displacement means include an axial screw mechanism driven in rotation by an electric motor.

8. A transmission according to claim 1, wherein said displacement means include a cam mechanism driven by an electric motor.

9. A transmission according to claim 1, wherein said displaced discoid element belongs to one of said first and second rotors, wherein the transmission further includes coupling means for mechanically connecting in rotation said displaced discoid element with said adjacent discoid element, and wherein said coupling means includes said displacement means, the connection between said two rotors being achieved via contact of said displaced and adjacent discoid elements.

10. A continuously variable electromagnetic transmission, including a commutator-less, axial flux dynamoelectric machine provided with an input shaft and an output shaft, and control means for controlling and supplying electric power at a variable frequency to said machine, said dynamoelectric machine including a first rotor connected to said input shaft, a second rotor, connected to said output shaft, and a stator assembly, said two rotors and said stator assembly comprising respective interacting elements, said interacting elements of said stator assembly and of at least one of said rotors comprising active elements having windings connected to said control means and arranged to interact with the other rotor by means of magnetic flux through air gaps including axial air gaps between respective interacting elements of said rotors and said stator assembly, wherein said transmission includes displacement means for axially displacing at least one of said interacting elements to modify the width of the axial air gap between the displaced one of said interacting elements and an adjacent interacting element at least one of said displaced interacting element and said adjacent interacting element being one of said active elements having windings connected to said control means.

11. The transmission according to claim 10, wherein said displacement means include a cam mechanism driven by an electric motor.

12. A continuously variable electromagnetic transmission, including a commutator-less, axial flux dynamoelectric machine provided with an input shaft and an output shaft, and control means for controlling and supplying electric power at a variable frequency to said machine, said dynamoelectric machine including a first rotor connected to said input shaft, a second rotor, connected to said output shaft, and a stator assembly, said two rotors and said stator assembly comprising discoid elements, said discoid elements of said stator assembly and of at least one of said rotors comprising active elements having windings connected to said control means and arranged to interact with the other rotor by means of magnetic flux through air gaps including axial air gaps between respective discoid elements of said rotors and said stator assembly, wherein said transmission includes displacement means for axially displacing at least one of said discoid elements to modify the width of the axial air gap between this discoid element and an adjacent discoid element, and wherein said displacement means include a cam mechanism driven by an electric motor.

* * * * *